Figure 1:
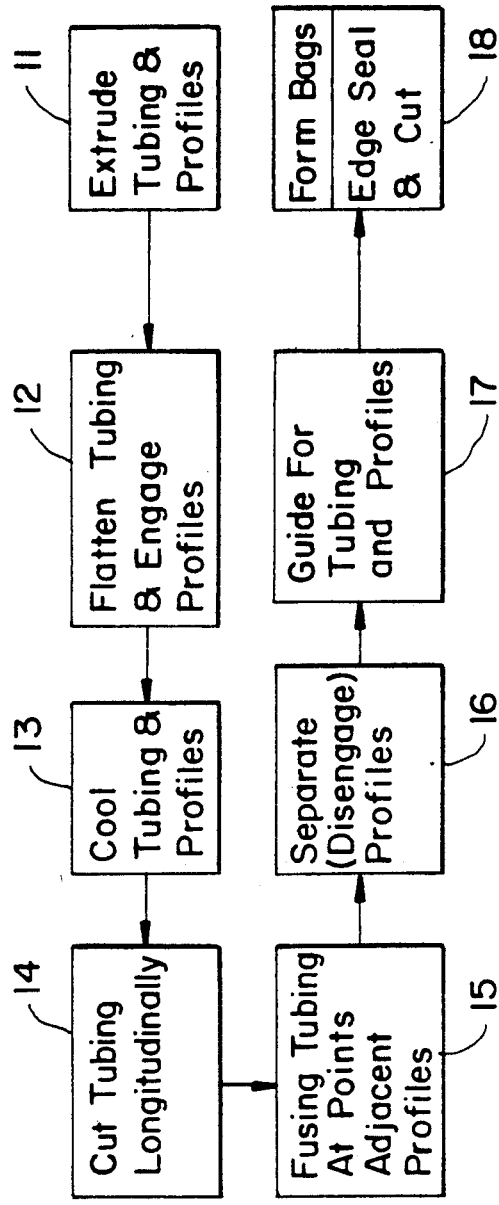

United States Patent [19]

Bruno et al.

[11] Patent Number: 5,334,127
[45] Date of Patent: Aug. 2, 1994

[54] RECLOSABLE PLASTIC BAGS MADE WITH OPEN MOUTH AND METHOD OF MAKING OPEN MOUTH BAGS

[76] Inventors: Edward C. Bruno, 15336 Penwood Pl., Aurora, Colo. 80015; Roger A. Davison, 8761 Galen Ct., Denver, Colo. 80229

[21] Appl. No.: 24,325

[22] Filed: Mar. 1, 1993

[51] Int. Cl.$^5$ .................... B31B 3/64; B31B 3/72
[52] U.S. Cl. .................... 493/194; 493/211; 493/214; 156/66
[58] Field of Search ............... 493/193, 194, 195, 196, 493/211, 213, 214, 927

[56] References Cited

U.S. PATENT DOCUMENTS

| Re. 29,208 | 5/1977 | Naito | 156/91 |
| 3,532,571 | 10/1970 | Ausnit | 493/214 |
| 3,853,671 | 12/1974 | Ausnit | 156/66 |
| 4,249,982 | 2/1981 | Ausnit | 156/66 |
| 4,698,274 | 10/1987 | Ausnit et al. | 493/927 |
| 4,807,300 | 2/1989 | Ausnit et al. | 493/214 |
| 4,846,586 | 7/1989 | Bruno | 383/9 |
| 5,057,065 | 10/1991 | Buchman | 493/211 |
| 5,131,121 | 7/1992 | Herrington et al. | 156/66 |

Primary Examiner—William E. Terrell
Attorney, Agent, or Firm—Leo J. Aubel

[57] ABSTRACT

A method and apparatus for forming recloseable plastic bags having engageable mating profiles wherein the bags are made to have an initially open mouth. The profiles which are made to be in an closed condition are opened by a blade apparatus which engages and opens the profiles at a point after the tubing is fused or tacked to thereby maintain proper alignment of the profiles when the bags are made.

6 Claims, 4 Drawing Sheets

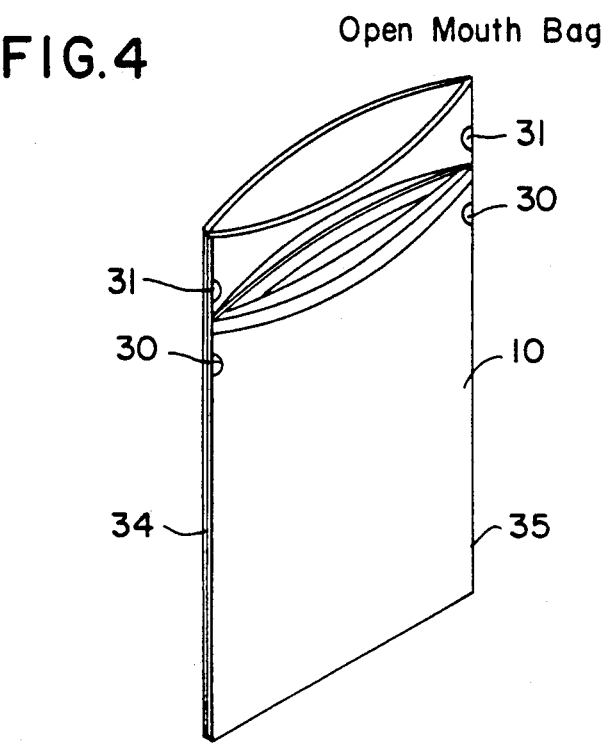
FIG.4  Open Mouth Bag
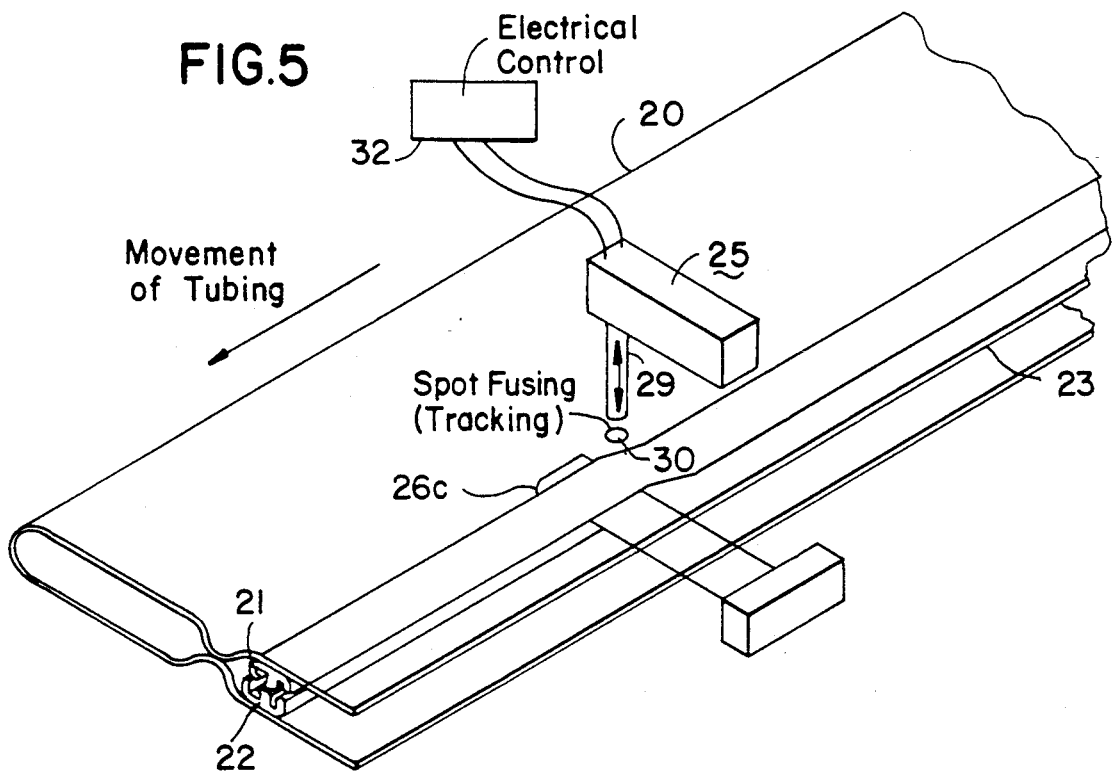
FIG.5

RECLOSABLE PLASTIC BAGS MADE WITH OPEN MOUTH AND METHOD OF MAKING OPEN MOUTH BAGS

BACKGROUND OF THE INVENTION

Recloseable plastic bags are well known in the art.

It is known in the prior art to provide a thin sheet of tubular stock material which is extruded as a tube and is formed with one or more mating profiles which profiles are partially cooled and then interlocked. The interlocked profiles and tube are then sealed and severed to form bags. The interlocked profiles form the mouths of the bags and can be opened by the user and reclosed as desired. U.S. Pat. No. 4,846,586 issued to Edward C. Bruno discloses plastic bags which are formed to have initially open mouths; that is bags are formed with the mating profiles being in a non-locked condition. One principal advantage of a bag received with an open mouth is that a user, such as a clerk in a deli counter can grab an already open bag from a stand or a box and promptly insert goods into the bag without the additional wasted time of having to initially open the bag. Also, the advantage is very apparent in a product packing line wherein the packer gets an already open bag, thereby eliminating the extra step of opening the bag.

SUMMARY OF THE INVENTION

The present invention discloses a recloseable plastic bag having mating profiles which is made with the mouth of the bag open; that is, with the mating profiles in an unlocked condition, and to an improved method of making plastic bags with open mouths.

The foregoing features and advantages of the present invention will be apparent from the following more particular description of the invention. The accompanying drawings listed hereinbelow, are useful in explaining the invention.

DRAWINGS

Figure 2:
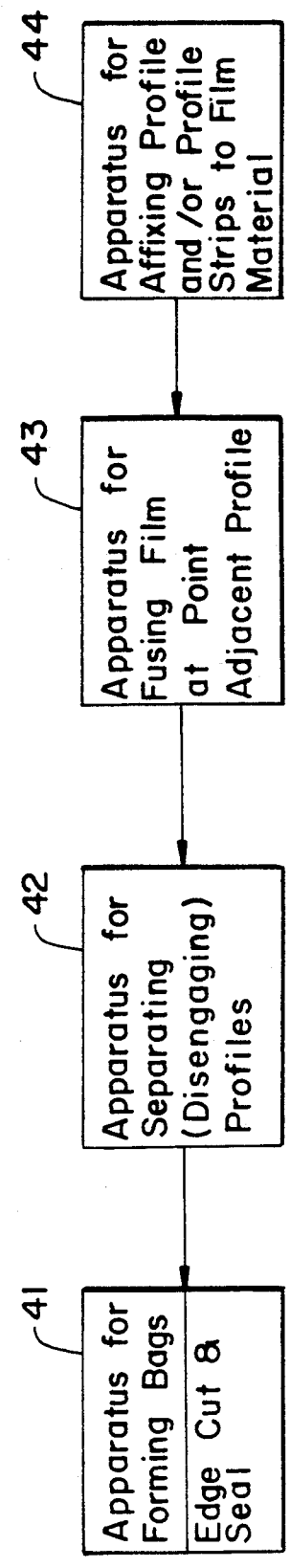
Figure 3:
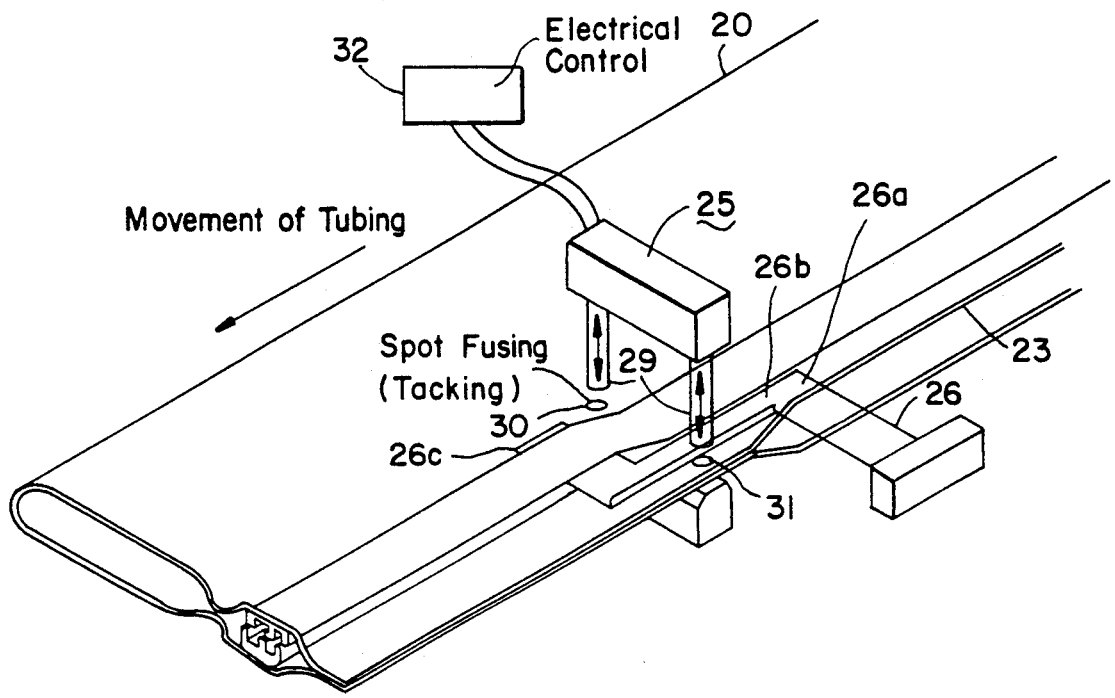
Figure 3A:
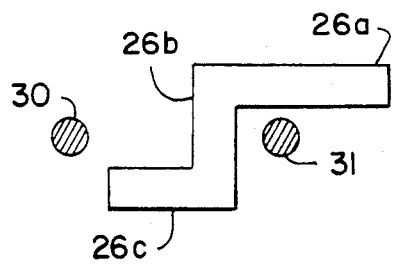
Figure 3B:
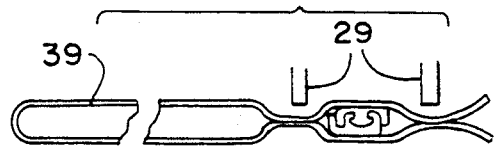
Figure 3C:
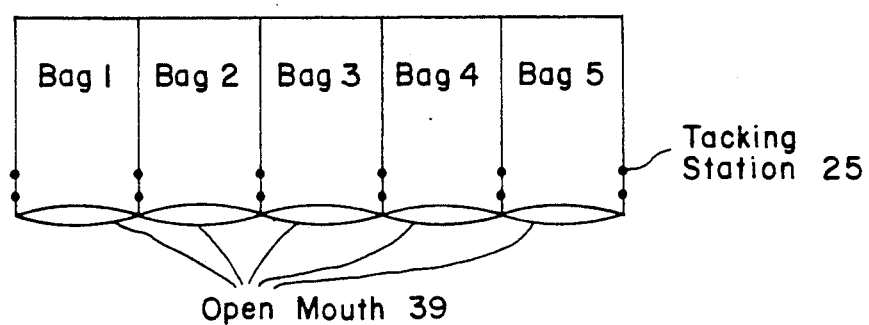

FIG. 1 is a flow chart depicting the steps in forming bags in accordance with the invention, FIG. 2 depicts apparatus for forming bags in accordance with a second embodiment of the invention, FIG. 3 shows apparatus for spot fusing the tubing film and apparatus for separating the profiles, and FIG. 3A is a sketch showing the positioning of the spot fusing or tacks relative to the blade means, FIG. 3B is a sketch showing the positioning of the spot fusing relative to the mating profiles, FIG. 3C is a sketch showing the positioning of the spot fusing relative to the formed bags, FIG. 4 shows an open mouth bag made in accordance with the invention and showing the spot fusing or tacks formed on the formed bag.

Figure 6:
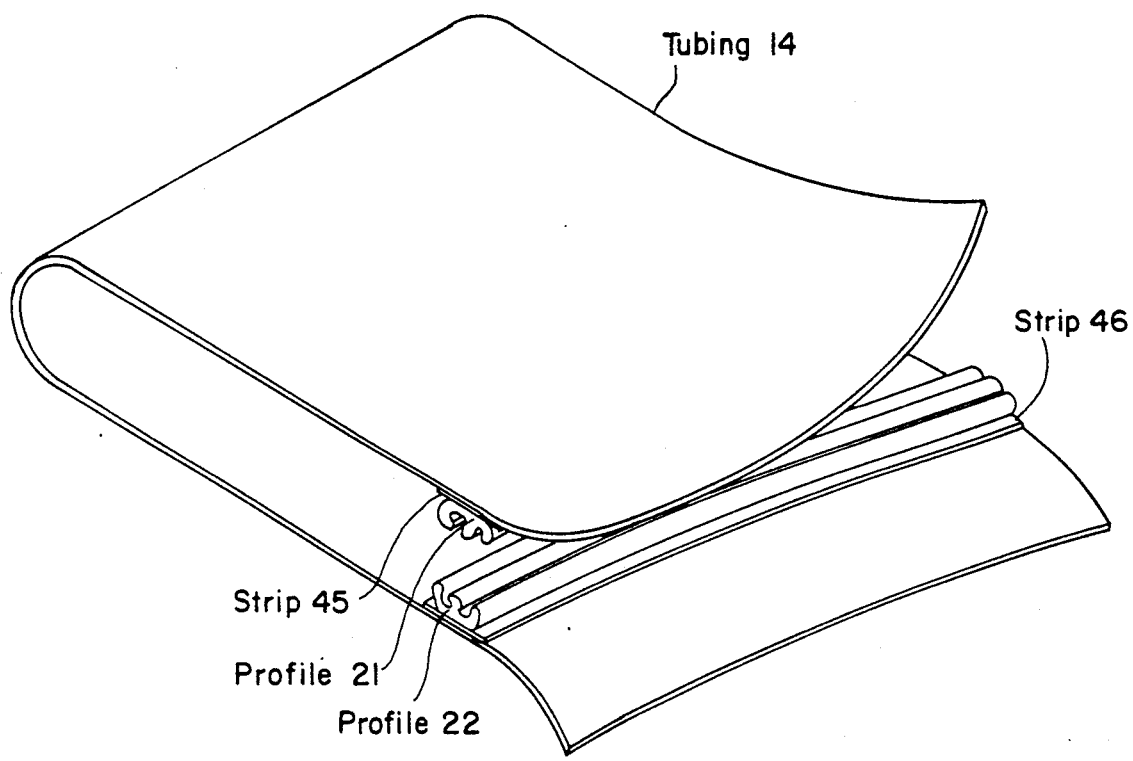

FIG. 5 hows a second embodiment of the invention wherein a single spot fusing or tack is utilized in making the invention open mouth bag, and FIG. 6 shows an embodiment of the invention wherein profiles made on or affixed to strips are utilized to form the inventive open mouth bags.

DESCRIPTION OF THE INVENTION

FIG. 1 depicts the process of forming bags in-line; that is, the process of forming bags 10 shown in FIG. 3 directly from the plastic tubing film being extruded from the extruder. In FIG. 1, block 11 depicts the apparatus and method of extruding tubing and recloseable mating profiles as is well known in the art. The block 12 depicts the well known apparatus and method of flattening the tubing and engaging the profiles, to enable the profiles to cool while engaged, to thereby assure a good closure and seal, after the profiles cool and after the bag 10 is made. The block 13 indicates the apparatus and method of cooling the tubing and profiles. The block 14 depicts the apparatus and method for cutting the tube longitudinally (slitting the tubing) to form a U-shaped member. All the foregoing apparatus and steps are well known in the art, see for example U.S. Pat. No. Re. 29,208.

The recloseable plastic bags made in accordance with the prior art as shown in U.S. Pat. No. Re. 29,208 have their mating profiles engaged, and the bags are made with their openings or mouths being closed. In contrast to the prior art, the present invention makes the recloseable plastic bags 10 with the mating profiles being disengaged or unlocked and the mouth of the bags 10 being open.

The block 15 depicts an important feature of the invention wherein the tubing 20 is fused at points or spots adjacent the profiles 21 and 22, before or prior to separating the profiles by a specially constructed and positioned blade means 26, as will be described fully thereinbelow, and as depicted in the block 16 of FIG. 1. The apparatus and method for disengaging the profiles is also shown in FIGS. 3, 3A and 3B, and will be described in detail hereinafter.

The block 17 depicts the guiding of the plastic tubing or film and the profiles through the processing and cooling mechanism, as is well known. The block 18 depicts the apparatus and method for forming the bags including the apparatus and method for edge sealing and cutting of the plastic tubing to form the recloseable plastic bags 10 as shown in FIG. 4. The apparatus and method for sealing and forming bags is also well known in the art.

Refer now to FIG. 3. In FIG. 3, the tubing 20 extruded by the extruder which has been flattened to engage the mating profiles 21 and 22, and which has been further cooled and longitudinally slit as at 23 is driven by suitable rollers to and through the inventive mating profile separating means or apparatus 25. Note, that the profiles 21 and 22 are engaged or closed at a position to the right (as oriented in FIG. 3) of separating blade means 25.

In a preferred embodiment, profile separating means apparatus 25 comprises a "Z" shaped member or blade 26 supported as at 27 to extend between the slit 23 of the tubing 20. The supported end portion 26a of blade 26 extends toward the engaged mating profiles 21 and 22 and the mid portion 26b of blade 26 extends parallel to the profiles 21 and 22. The free end portion 26c blade 26 extends into the tubing 20 between the profiles 21 and 22 to intercept the engaged profiles and force them to separate and disengage.

Importantly, at a point ahead or before the blade 26c engages or meets the moving tubing 20 and affixed profiles 21 and 22 the film is spot fused or tacked at a position adjacent the profiles, as shown in FIGS. 3 and 3B. A controlled heat fusing means 29 is selectively controlled to move downwardly, by electrical control mechanism 32, well known in the art, to spot fuse, weld tack the tubing film as at 30 and 31 adjacent the profiles 21 and 22. Fuse tack 30 is made below the profiles 21 and 22 and fuse tack 31 is made above profiles 21 and 22.

The fusing means 29 may be any known ultra sonic device or electrical heating device. Fusing means 29 is actuated to effect a fusing or tacking at the sides of each bag being made as indicated in FIG. 3C.

Accordingly, the side of the film of the tubing 20 tacked or fused together before the profiles 21 and 22 are separated. This assures that the profiles 21 and 22 remained aligned with each other, when they are reclosed or teengaged, and even though they become physically separated. Note, that the sides of the bags 10 being made will be fused or tacked in position even though the profiles 21 and 22 are disengaged in the center of the bag 10 as shown in FIG. 4.

Next the separated profiles 21 and 22 are guided to the edge sealing and cutting station 17, well known in the, to edge seal and cut the sides of the bag 10 as at 34 and 35. Note that, as shown in FIG. 4, the fused spots or tacks 30 and 31 are vertically aligned with the edge seals 34 and 35 of the bag 10.

It has been found that while two fused spot, fusings or tacks 30 and 31 are preferred, that is fusings above and below the profiles are preferred, in some instances a single fusing or tack may be used. In such instances where a single tack is utilized, the lower fusing or tack 30 appears to hold the profiles 21 and 22 in better alignment. When a single fusing or tack is utilized, the separating blade can comprise a substantially straight bar blade 26d; that is blade 26d can extend straight out to a support 27.

FIG. 2 depicts a method and apparatus for making recloseable plastic bags 10 with mating profiles 21 and 22 wherein the profiles are made or extruded separately from the tubing, as is well known in the art. In FIG. 2, the direction of movement of the tubing is depicted as being from right to left. The first block 44 indicates apparatus (of any well known type) for affixing the profile and/or profile strips to the film material; next, block 43 indicates the apparatus for fusing the film tubing at a point adjacent the profile, as described hereinabove; next, block 42 indicates the apparatus for separating or disengaging the profiles, also as described above; and, lastly block 41 indicates the apparatus for forming the bags including the operation of edge cutting and sealing the bags.

As shown in FIG. 6, the profile 21 is formed as a portion of the strip of plastic film 45 and profile 22 is formed as a portion of the strip of plastic film 46. As in the previously described method and apparatus, the profiles 21 and 22 are fed to the bag making equipment in an initially closed or mating condition. The tubing 20 is fed through the separating apparatus 25 as described above to fuse or tack the tubing 20 at points adjacent the profiles 21 and 22 to effectively delineate the sides of the bags 10 being formed before the profiles are separated and the tubing is edge sealed and cut to form the bags 10.

While the invention has been particularly shown and described with reference to a preferred embodiment thereof, it will be understood by those skilled in the art, that various changes in form and detail can be made therein without departing from the spirit and scope the invention.

We claim:

1. In a method of making reclosable plastic bags wherein the bags are made by extruding plastic film from an extruder as continuous tubing having making fastener profiles moving the tubing along a longitudinal path and flattening the tubing engaging, the profiles to mate and close with each other, and slitting the tubing longitudinally; the improvement consisting of the steps of:
    a) periodically fusing the engaged and slit continuous tubing on at least one selected area adjacent said profiles as said tubing moves along said path, and
    b) separating said profiles of the fused continuous tubing at a path position subsequent to said fusing, whereby said tubing and profiles may then be sealed and cut to form bags with open profiles and with open mouths.

2. In a method of making recloseable plastic bags having mating engageable fastener profiles wherein the bags are made by extruding plastic as elongated moving tubing and profiles, moving said tubing and profiles along a longitudinal path relative to said tubing and profiles, flattening said tubing, affixing and engaging said profiles with each other along their lengths, cutting said tubing longitudinally thereof and adjacent said profiles to form a U-shaped web with engaged profiles moving along said longitudinal path, the improvement consisting of the steps of:
    a) periodically fusing said moving U-shaped web but not said profiles, on at least one selected area adjacent said profiles as said member moves along said path,
    b) separating said profiles of the fused U-shaped web at a path position subsequent to said fusing, whereby the fused web can next be sealed and cut to form bags with open profiles.

3. In apparatus for making recloseable plastic gags having mating engageable fastener profiles with the mouth of the bags being open, said apparatus including means for extruding elongated plastic tubing with mating profiles, means for flattening said tubing and engaging said profiles with each other, means for moving said tubing along a path longitudinal thereto, and means for cutting said tubing longitudinal thereto, and means for cutting said tubing longitudinally thereof to form a U-shaped elongated tubing member with engaged profiles and open edges, the improvement including:
    a) controllable means for fusing said tubing member at selected longitudinally spaced areas adjacent said profiles, said controllable means fusing said tubing member at a first area adjacent said edges and above said profiles, and at a second area away from said edges and below said profiles, and
    b) a blade means for separating said profiles of the fused elongated tubing member at a point after said tubing member has been fused at selected spaced areas,
    whereby said elongated tubing member can be subsequently sealed and cut to form bags with open mouths.

4. The improved apparatus as in claim 3 wherein said blade means is Z-shaped, and one extremity of the Z-shaped shaped blade means extends between the fused areas and between the profiles.

5. In apparatus for making recloseable plastic bags having mating engageable fastener profiles with the mouth of the bags being open, said apparatus including means for extruding elongated plastic tubing with mating profiles, means for flattening said tubing and engaging said profiles with each other, means for movings aid tubing along a path longitudinal thereto, means for cutting said tubing longitudinally thereof to form a U-shaped elongated tubing member with engaged profiles and open edges, the improvement comprising:

a) controllable means for fusing said tubing member at selected longitudinally spaced areas adjacent said profiles, said controllable means fusing said tubing member at a first area away from said edges and below said profiles, and b) a blade means having a substantially straight configuration for separating said profiles of the fused elongated tubing member at a point after said elongated member has been fused at the selected spaced areas, whereby said elongated tubing member can be subsequently sealed and cut to form bags with open profiles and open mouths.

6. In a method of making reclosable plastic bags wherein the bags are made by extruding continuous plastic film tubing from an extruder, affixing strips of mating fastener profiles to said tubing, moving the tubing along a longitudinal path and flattening the tubing, engaging the profiles to mate and close with each other, and slitting the tubing longitudinally; the improvement consisting of the steps of:

a) periodically fusing the engaged and slit continuous tubing on at least one selected area adjacent said profiles as said tubing moves along said path, and b) separating said profiles of the fused continuous tubing at a path position subsequent to said fusing, whereby said tubing and profiles may next be sealed and cut to form bags with open profiles and open mouths.

\* \* \* \* \*

UNITED STATES PATENT AND TRADEMARK OFFICE
CERTIFICATE OF CORRECTION

PATENT NO. : 5,334,127
DATED : Aug.2,1994
INVENTOR(S) : Edward C. Bruno
Roger A. Davison It is certified that error appears in the above-indentified patent and that said Letters Patent is hereby corrected as shown below:

Claim 1 should read as follows:

1. In a method of making reclosable plastic bags wherein the bags are made by extruding plastic film from an extruder as continuous tubing having mating fastener profiles, moving the tubing along a longitudinal path and flattening the tubing, engaging the profiles to mate and close with each other, and slitting the tubing longitudinally, the improvement consisting of the steps of:
   a ) periodically fusing the engaged and slit continuous tubing on at least one selected area adjacent said profiles as said tubing moves along said path, and
   b) separating said profiles of the fused continuous tubing at a path position subsequent to said fusing,
whereby said tubing and profiles may then be sealed and cut to form bags with open profiles and with open mouths.

Signed and Sealed this

Ninth Day of September, 1997

Attest:

BRUCE LEHMAN

Attesting Officer

Commissioner of Patents and Trademarks